United States Patent [19]

Porter

[11] 4,204,835

[45] May 27, 1980

[54] APPARATUS FOR TREATING SOLID PARTICULATE MATERIAL

[75] Inventor: Edward S. Porter, Walnutport, Pa.

[73] Assignee: Fuller Company, Bethlehem, Pa.

[21] Appl. No.: 961,316

[22] Filed: Nov. 16, 1978

[51] Int. Cl.² ............................................. F27B 15/00
[52] U.S. Cl. ..................................... 432/58; 432/106
[58] Field of Search .................. 432/14, 106, 103, 223, 432/58; 165/DIG. 2

[56] References Cited

U.S. PATENT DOCUMENTS

| | | | |
|---|---|---|---|
| 3,452,968 | 7/1969 | Shimizu et al. | 432/106 |
| 3,829,285 | 8/1974 | Beck | 165/154 |
| 3,862,294 | 1/1975 | Engelhart | 432/106 |
| 4,071,310 | 1/1978 | Ghestem | 432/106 |
| 4,078,882 | 3/1978 | Houd | 432/106 |
| 4,094,626 | 6/1978 | Boyhont et al. | 432/106 |
| 4,102,632 | 7/1978 | Hastings | 432/223 |

Primary Examiner—Henry C. Yuen
Attorney, Agent, or Firm—Frank H. Thomson

[57] ABSTRACT

A cement clinker manufacturing apparatus which includes a suspension preheater, a precalcining furnace, a clinkering furnace such as a rotary kiln and a clinker cooler. Combustion air for use in the clinkering furnace is supplied from the clinker cooler. Combustion air for use in the calcining furnace is supplied from an indirect heat exchanger which receives hot gas from the outlet of the suspension preheater. This hot gas is placed in indirect heat exchange with ambient air to heat the ambient air. The thus heated ambient air is then supplied to the calcining furnace. The invention is particularly useful where the clinker cooler exhaust air cannot be used in the calcining furnace as preheated combustion air. A valve can be provided for regulating the volume of heated air supplied to the calcining furnace from the indirect heat exchanger.

4 Claims, 3 Drawing Figures

APPARATUS FOR TREATING SOLID PARTICULATE MATERIAL

BACKGROUND OF THE INVENTION

This invention relates to apparatus for calcining fine grained material such as cement raw meal, limestone, dolomite, and the like. The invention is specifically directed to an apparatus for manufacturing cement clinker employing a suspension preheater, a precalcining furnace, a clinkering furnace and a clinker cooler, but it should be understood that it can be applied to uses which do not include a separate clinkering furnace.

Prior to the present invention, suspension preheaters which utilize the exhaust gases from the clinkering furnace or rotary kiln of a cement clinker manufacturing facility were well known. Also known prior to the present invention was the use of a precalcining furnace or flash calciner positioned at the material outlet of the suspension preheater and before the clinkering furnace. The use of a precalcining furnace serves to perform most of the raw material calcining function outside of the rotary kiln so that the rotary kiln has the limited function of completion of calcination and the primary function of sintering the calcined raw material to form cement clinker. This use of a precalcining furnace has enabled a substantial increase in production to result and, in fact, permits substantially a two-fold increase in the production capabilities of a given size rotary kiln.

Typically, a flash furnace will receive preheated air for combustion from the clinker cooler of the cement manufacturing plant. This may be supplied to the flash furnace either from a separate duct connected directly from the cooler vent outlet to the flash furnace, or excess air may be supplied through the rotary kiln to be burned in the flash furnace. If desired, the exhaust gases from the rotary kiln may be mixed with cooler exhaust air at a point external to both the rotary kiln and the flash furnace to then be supplied to the flash furnace. Typical of the prior art is U.S. Pat. No. 3,891,382 of which the present inventor is a co-inventor.

It is known that there are instances when it is a disadvantage to utilize too many stages of preheat of the raw material and the gases discharged from the preheater are at a substantially elevated temperature. One example is where the raw material includes a carbon bearing material such as oil shale. If such a material is exposed to a gradual heating from a relatively low temperature to a higher temperature in a multiple stage preheater, the carbon bearing material will reach a temperature at which the carbon will volatilize. This can result in a plugging of the preheater. For this reason, conventional preheaters have not found acceptance in the cement industry where carbon bearing raw materials are encountered. If such a raw material is utilized, it is advantageous to use either a single stage of preheat or no preheater at all. In such an installation, the temperature of the exhaust gases from the preheater, if there is one, or the exhaust gases from the kiln itself are quite high and often wasted. Prior to the present invention it has been known to use such gases in a waste heat boiler. It has been found by the present invention that this heat can be utilized in the cement manufacturing operation by using this heat to heat the combustion gas supplied to a precalcining furnace.

Another application where it is not practical to use prior apparatus for manufacturing cement which includes a flash furnace is the application where preheated air from the clinker cooler cannot be utilized in the precalcining furnace. One such instance is where an attached tube clinker cooler is employed. Such coolers are unable to provide a volume of preheated air which can be transported to the flash furnace separate from the preheated air supplied to the kiln.

Another instance where waste heat from a cooler is unavailable for use in a precalcining furnace is in the manufacturing of white cement. In the manufacture of white cement, it is possible that no clinker cooler will be used. If a cooler is used, very little if any recoverable heat may be available from the cooler. In addition, white cement plants are often operated at high temperatures resulting in large quantities of high temperature gases being discharged from the preheater. In the above applications some other source of preheated combustion air must be found in order to utilize the full advantages of a precalcining furnace and make such an installation fuel efficient.

SUMMARY

It is therefore the principal object of this invention to provide an apparatus for calcining fine grained material which includes a novel means for supplying preheated combustion air to the calcining furnace.

It is another object of this invention to provide an apparatus for calcining fine grained material which utilizes hot exhaust gases from a preheater to preheat ambient air which ambient air can be used as combustion air in the calcining furnace.

In general, the foregoing objects will be carried out by providing an apparatus for calcining fine grained material comprising: a calcining furnace including an inlet for fine grained material to be calcined, an inlet for hot gas for calcining the fine grained material, and an outlet for calcined material and hot gas; a gas-solid separator including an inlet for gas and entrained solids flow connected to the outlet of said calcining furnace, an outlet for separated gas and an outlet for separated fine grained material; an indirect heat exchanger including an inlet for hot gas flow connected to the outlet for separated gas of the gas-solids separator, an inlet for ambient air whereby the ambient air is heated by indirect heat exchange contact with the hot gas from the gas-solids separator, and an outlet for the thus heated ambient air; and means for flow connecting the outlet for heated ambient air of said indirect heat exchanger with the inlet for hot gas of the calcining furnace.

BRIEF DESCRIPTION OF THE DRAWING

The invention will be described in connection with the annexed drawing wherein.

DESCRIPTION OF THE PREFERRED EMBODIMENTS

Figure 3:
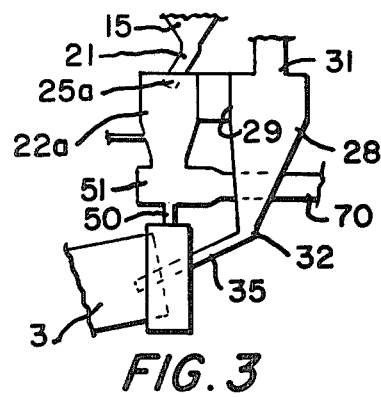
FIG. 3 is a fragmentary view of a modified calciner which may utilize the present invention.

Referring to the drawing, the apparatus for manufacturing cement clinker according to the present invention includes, in the direction of material flow, a preheater means generally indicated at 1, a calcining furnace generally indicated at 2, a clinkering furnace or rotary kiln 3, a clinker cooler 4 and an outlet 5 for cement clinker.

The suspension preheater 1 is similar to those generally known in the art and includes a plurality of serially connected gas-solids separators or cyclones 10 and 15. The gas-solids separator 10 includes an inlet 11 for hot gas and suspended material 11, an outlet 12 for separated solids and an outlet 13 for separated gas. Similarly, the gas solids separator 15 includes an inlet 16 for hot gas and suspended solids, an outlet 17 for separated solids and an outlet 18 for separated gas. The outlet 18 of gas-solid separator 15 is flow connected to the inlet 11 of gas solid separator 10 by means of a conduit 19. An inlet 20 for raw material to be calcined and clinkered is flow connected to the conduit 19 for supplying material to the preheater 1 so that the fine grained raw material is entrained in the gas stream in conduit 19 and conveyed to separator 10.

The calcining furnace 2 may take the form of any of the prior known calcining furnaces such as that illustrated in the aforementioned U.S. Pat. No. 3,891,382. In general, the calcining furnace 2 includes a vessel 22 having an inlet 23 for hot gas, an inlet 24 for fuel for combustion within the vessel 22, an inlet 25 for raw material to be calcined, and an outlet 26 for calcined material and hot gas. Part of the calcining furnace 2 and the preheater apparatus 1 is a gas-solids separator or separator means 28 which includes an inlet 29 for gas and entrained solids which is flow connected to the outlet 26 of the calciner 2 by means of a duct 30. The gas-solids separator 28 also includes an outlet 31 for separated hot gas and an outlet 32 for separated fine grained and at least partially calcined material. The outlet 31 for hot gas is flow connected to the suspension preheater 1 in general and specifically to the inlet 16 of separator 15 by means of a conduit 33. Fine grained material discharged through outlet 12 of separator 10 is supplied to duct 33 by means of a conduit 14 so that this fine material is entrained in the hot gas discharged from separator 28 through outlet 31 and conveyed to separator 15.

The operation of the preheater 1 and calciner 2 is generally known. Raw material admitted to the system at 20 is entrained in the hot gas discharged from separator 15 and conveyed to separator 10. During this entrainment and conveying, heat in the gas is transferred by direct contact to the fine grained raw material. The initially heated raw material discharged from separator 10 is conveyed through conduit 14 into conduit 33 where the hot gases discharged from gas-solids separator 28 entrain and convey the material to separator 15. During this entrainment, the fine material is subjected to further preheating. The thus preheated raw material is discharged from separator 15 through conduit 21 to the inlet 25 for raw material of the flash calciner 2. Combustion of fuel takes place within vessel 22 of the calcining furnace 2 to achieve a temperature of approximately 900° C. to achieve substantially complete calcination of the cement raw meal. Spent combustion gas and entrained calcined material are discharged from the calciner vessel 22 through outlet 26 and conduit 30 to separator 28. The hot exhaust gas from the separator 28 is then supplied to preheater 1, and separated calcined material is discharged through outlet 32.

Figure 1:
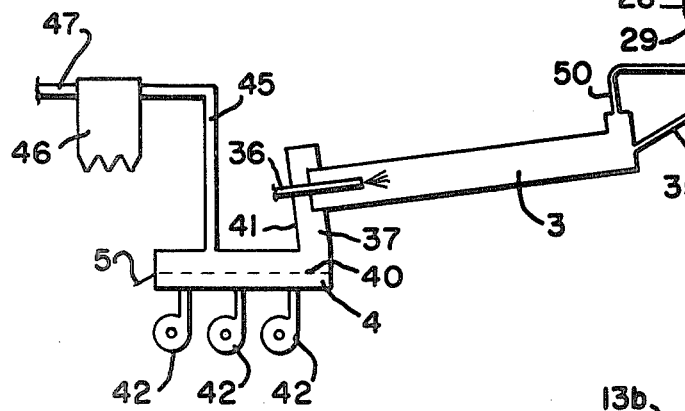
FIG. 1 is a diagrammatic view of the overall cement clinker manufacturing apparatus of the present invention.
Figure 2:
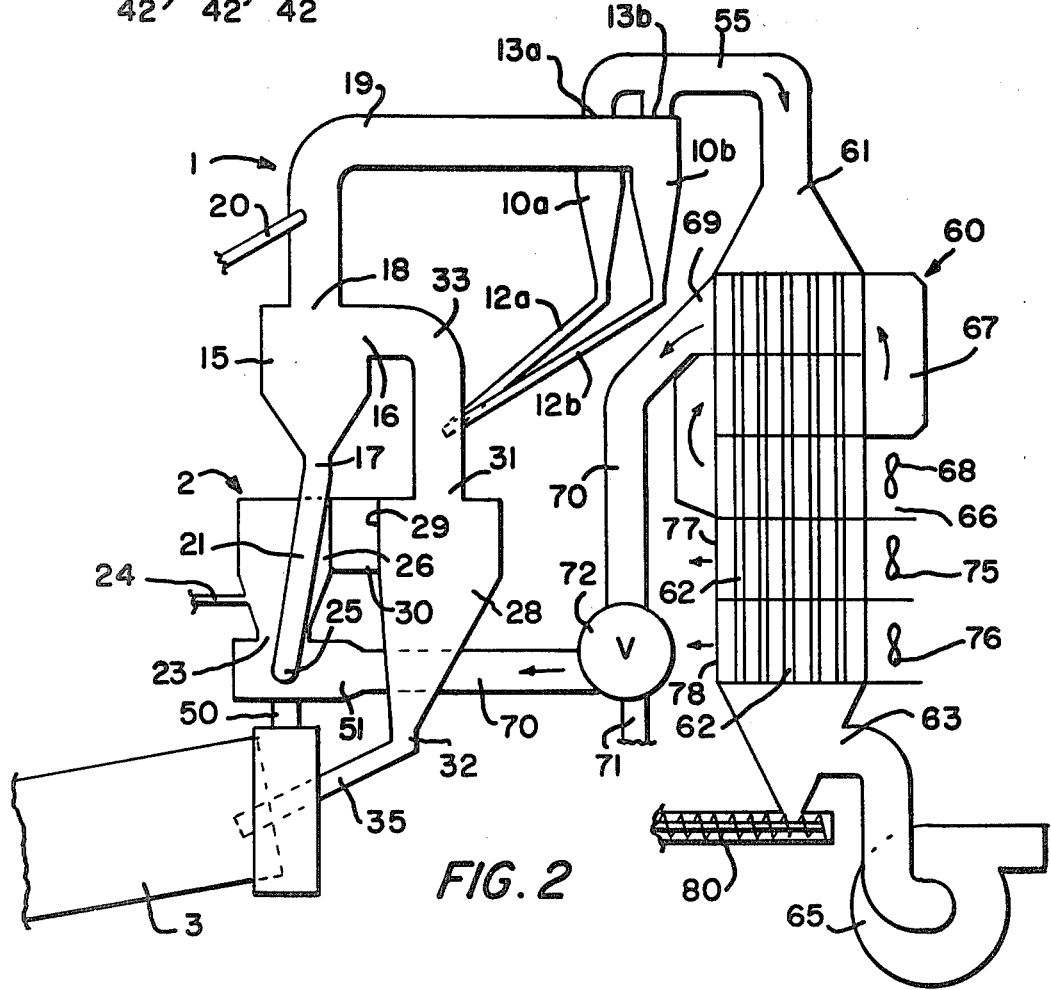
FIG. 2 is a view on an enlarged scale of a portion of the apparatus shown in FIG. 1

It should be noted that in FIG. 2, the separator 10 of FIG. 1 has been shown as two smaller parallel separators 10a and 10b with parallel material outlets 12a and 12b. The gas outlets 13a and 13b of these separators join duct 55 in the same manner as the outlet of separator 10 of FIG. 1.

The at least partially calcined material discharged from separator 28 through outlet 32 is supplied to the clinkering furnace 3 by means of a feed pipe 35, where any final calcination and sintering take place to form cement clinker in a manner well known in the art. The rotary kiln 3 is supplied with preheated combustion air through conduit 37 from the clinker cooler 4. The clinker cooler may take the form of a reciporcating grate cooler as illustrated which is well known in the art and includes movable grates 40 diagrammatically illustrated in FIG. 1 for supporting and transporting a bed of clinker from the inlet 41 of the cooler 4 to the outlet 5. Suitable fans 42 blow ambient air up through the bed of hot clinker to thereby cool the cement clinker. The cooling air is heated by the hot clinker and supplied to the kiln 3 through conduit 37 as preheated combustion air. Excess cooling air is exhausted from the cooler 4 through a duct 45 and a high efficiency dust collector 46 to atmosphere through conduit 47. Alternatively, an attached tube or other known cooler may replace the grate cooler 4. In those applications such as the manufacture of white cement where little or no preheated air is available from a clinker cooler, ambient air may be supplied to the kiln 3 for use as combustion air in the kiln.

Spent combustion gases from the clinkering furnace 3 are exhausted therefrom through a conduit 50 and conducted to a mixing chamber 51 which is flow connected to the inlet 23 for hot gas of the calcining furnace 2.

The outlet 13 of the preheater 1 and specifically the gas solids separator 10 is flow connected by means of a conduit 55 to an indirect heat exchanger generally indicated at 60. Since only a two-stage preheater is employed, the hot gas discharged from preheater 1 will be at a substantially elevated temperature on the order of 500° C. If only a single stage preheater is used the gas will be at an even higher temperature.

It has been found by the present invention that this hot gas discharged from the preheater, can be utilized to preheat combustion air for use in the flash furnace 2. In order to fully utilize this heat without re-entraining the spent combustion air to the system, it has been found that an indirect heat exchanger is the best mode of utilizing the heat in these gases.

The indirect heat exchanger 60 includes an inlet 61 for hot gas which is flow connected by means of duct 55 and preheater 1 to the outlet 31 for separated gas of the gas solids separator 28. If no preheater stages were used, the inlet 61 could be directly connected to the outlet of the separator 28. The indirect heat exchanger 60 also includes a plurality of tubes 62 for the hot gas and an outlet 63 for hot gas which is flow connected to a fan means 65 which is in turn connected to a high efficiency dust collector (not shown). The fan 65 serves to induce a draft in the indirect heat exchanger 60, preheater, separator 28, calciner 2 and kiln 3.

The indirect heat exchanger 60 also includes an inlet 66 for ambient air and suitable duct means 67 which crosses the tubes 62 for hot gas to provide indirect heat exchange contact between the ambient air and the hot gas to thereby heat the ambient air and finally cool the exhaust gases from the preheater. The thus finally cooled exhaust gas can then be supplied directly to a high efficiency dust collector such as a fabric filter dust collector without further conditioning to insure that the fabric filters do not encounter air of such a high temperature that the fabric filter could be burned. The use of indirect air to air heat exchangers for the purpose of cooling hot gas prior to it being supplied to a dust collector is known and has been used in the cement industry prior to the present invention, but it is not believed to be known to use such a heat exchanger in the manner of the present invention.

Fan means diagrammatically illustrated at 68 are provided to induce the flow of ambient air from the inlet 66 through the conduit 67 to an outlet 69 for the thus ambient air which is heated by contact with the tubes 62. The thus heated ambient air discharged from the indirect heat exchanger at outlet 69 may have a temperature on the order of 400° C. when the gases at inlet 61 have a temperature on the order of 500° C.

A conduit means 70 flow connects the outlet 69 for heated ambient air with the inlet 23 for the hot gas of the calcining furnace 2 through the mixing chamber 51 to thereby supply preheated combustion air to the calcining furnace 2.

A bypass duct 71 may be flow connected to the conduit 70 for discharging a portion of the preheated ambient air directly to atmosphere. Because this ambient air has been heated by indirect heat exchange with the hot gases from the preheater, a dust collector need not be connected to conduit 71.

A valve means 72 is positioned in conduit 70 for controlling the volume of heated ambient air supplied from the indirect heat exchanger 60 to the calcining furnace 2 by directing all or a portion of the gas through conduit 70 or through by-pass 71. This valve means serves to provide control of the system and suitable temperature sensors (not shown) could be utilized to control valve 72.

The indirect heat exchanger 60 may also include additional fans 75 and 76 to finally cool the exhausted preheater gas to a temperature which can be easily handled by a fabric filter dust collector. The gases finally discharged through outlet 63 will be on the order of 300° C. when the inlet gases are at 500° C. The air from fans 75 and 76 may be discharged directly to atmosphere through outlets 77 and 78 as it is probably at too low a temperature to be utilized favorably in the calcining furnace 2.

The indirect heat exchanger 60 may also include a screw conveyor 80 for conveying particles which may drop out of the gas flow through the indirect heat exchanger. These particles may be conveyed to the inlet 20 for raw material of the system.

The overall process of the apparatus should be apparent from the foregoing description. Briefly stated, the raw material to be calcined and eventually clinkered if the process is used in its entirety is supplied to the preheater 1 at 20. The raw material flows generally downwardly through the preheater 1 to the calcining furnace 2. The thus preheated material is supplied to the calcining furnace 2 where at least partial calcination occurs. The at least partially calcined material is then supplied to the rotary kiln 3 for final sintering and clinkering. The sintered material is then cooled in the cement clinker cooler 4 and discharged from the system at 5. Preheating gases are supplied from the calcining furnace 2 and are made up of exhaust gases from the clinkering furnace 3 which is supplied to the calciner 2 and combustion gases from the calciner 2. Combustion air for use in the calciner 2 is supplied from ambient air which has been preheated by indirect heat exchange with exhausted gases from the preheater 1 and indirect heat exchanger 60.

Although the present invention has been illustrated employing preheater cyclones 10 and 15, it should be understood that more or less stages of preheat could be used. The outlet of 28 could be directly connected to indirect heat exchanger 60. If desired, other types of flash furnaces 2 could be employed.

The embodiment of FIGS. 1 and 2 has been illustrated as utilizing a flash furnace 2 having an inlet 25 for raw material to be calcined positioned in the bottom of the vessel 22 so that the inlet 23 for hot gas and the inlet 25 for raw material are located upstream from the inlet 24 for fuel in the direction of gas flow. In the embodiment of FIG. 3, the inlet 25a for material to be calcined is positioned in the top of the calciner vessel 22a so that the inlet 25a is upstream of the inlet 23 for hot gas and the inlet 24 for fuel in the direction of air flow within the vessel 22a. With this arrangement, the duct 21 leading from the outlet 17 of separator 15 to the inlet 25a for material can be substantially shorter than in the embodiment of FIGS. 1 and 2. The embodiment of FIG. 3 will result in a shorter residence time for material within the calcining vessel as compared to the residence time for material in the calciner 22 of FIGS. 1 and 2. The choice between FIGS. 1 and 2 or FIG. 3 will depend upon the type of fuel being used and the type of material being calcined.

It should be understood that the apparatus and process of FIG. 3 operaties in substantially the same manner as the apparatus and system of FIGS. 1 and 2. The difference between the two apparatus is in the calcining furnace.

Although the present invention has been described in connection with a cement manufacturing process, it should be understood that it can also be used in the calcination of other fine grained materials such as the calcination of alumina, limestone, dolemite and the like. In such applications, the separate clinkering furnace or kiln might not be employed. All thermal processing may take place in the calcining furnace 2. A fluid bed device may be used as a heat sink to subject the material discharged from the calciner to a longer period of heating without the addition of fuel. In such an application all air heated in the product cooler might be supplied to the fluid bed as its sole source of heat with the only source of preheated combustion air for the calcining furnace coming from the indirect heat exchanger 60.

From the foregoing it should be apparent that the objects of this invention have been carried out. A novel apparatus has been provided which permits the use of a calcining furnace where a complete preheater cannot be utilized. The apparatus may also be used where less than a full amount of preheated combustion air may be supplied from the clinker cooler.

It is intended that the foregoing be merely a description of a preferred embodiment, and that the invention be limited solely by that which is in the scope of the appended claims.

I claim:

1. Apparatus for manufacturing cement clinker comprising:
   a preheater having an inlet for raw material, an inlet for hot gas, an outlet for preheated raw material and an outlet for gas;
   a calcining furnace having an inlet for preheated raw material flow connected to the outlet for preheated raw material of the preheater, an inlet for combustion air, an inlet for fuel for combustion in the calcining furnace for at least partially calcining the raw material, and an outlet for hot spent combustion air and the at least partially calcined raw material;

separator means having an inlet flow connected to the outlet for spent combustion air and material of the calcining furnace, an outlet for separated hot spent combustion air flow connected to the inlet for hot gas of the preheater and an outlet for separated material;

a clinkering furnace having an inlet for at least partially calcined raw material flow connected to the outlet for separated material of said separator means, an inlet for combustion air, an inlet for fuel for combustion in the clinkering furnace, an outlet for spent combustion air and an outlet for cement clinker;

an indirect heat exchanger;

conduit means flow connecting the outlet for gas of said preheater with said indirect heat exchanger, means for supplying ambient air to the indirect heat exchanger for indirect heat exchange with gas from said preheater to thereby heat the ambient air;

means for supplying the thus heated ambient air to the inlet for combustion gas of the calcining furnace; and conduit means for by-passing heated ambient air to atmosphere and valve means in said means for supplying heated ambient air from the indirect heat exchanger to the inlet for combustion gas of the calcining furnace for controlling the volume of heated ambient air supplied to said calcining furnace.

2. Apparatus for manufacturing cement clinker according to claim 1 further comprising conduit means for supplying air from the outlet for spent combustion air of the clinkering furnace to the calcining furnace.

3. Apparatus for manufacturing cement clinker according to claim 2 wherein said indirect heat exchanger includes a plurality of parallel tubes for conducting gas from the preheater through the indirect heat exchanger from its inlet to its outlet for hot gas and fan means for blowing ambient air across said tubes to the outlet for ambient air.

4. Apparatus for manufacturing cement clinker according to claim 3 further comprising fan means flow connected to the outlet for hot gas of the indirect heat exchanger for inducing a draft in said clinkering furnace, said calcining furnace, said separator means, said preheater and said indirect heat exchanger.

* * * * *